No. 858,336. PATENTED JUNE 25, 1907.
P. F. FOLEY.
VARIABLE SPEED TRANSMISSION GEAR.
APPLICATION FILED APR. 5, 1907.
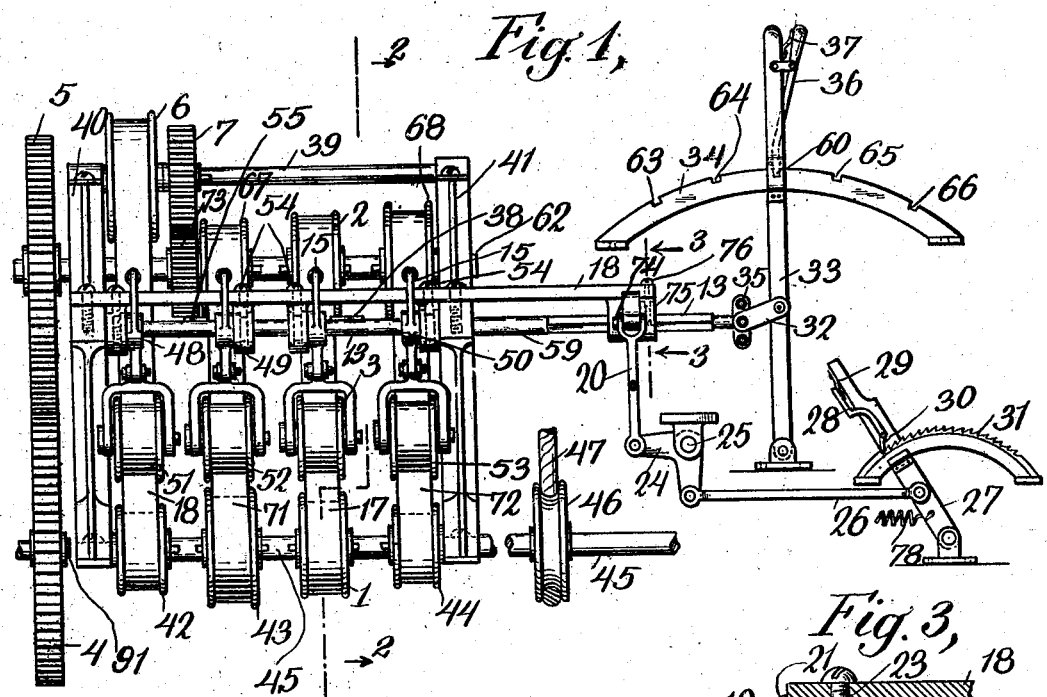
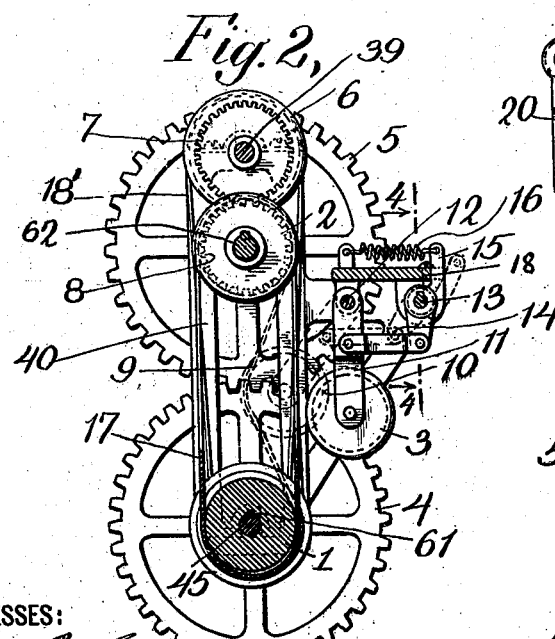
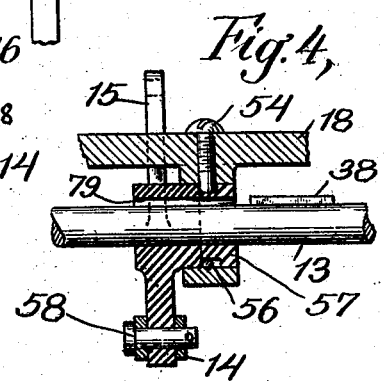
WITNESSES:
INVENTOR
Patrick F. Foley
BY
Duncan & Duncan
ATTORNEYS

UNITED STATES PATENT OFFICE.

PATRICK F. FOLEY, OF NEW YORK, N. Y.

VARIABLE-SPEED-TRANSMISSION GEAR.

No. 858,336.      Specification of Letters Patent.      Patented June 25, 1907.

Application filed April 5, 1907. Serial No. 366,620.

*To all whom it may concern:*

Be it known that I, PATRICK F. FOLEY, a citizen of the United States, and a resident of the city, county, and State of New York, have made certain new and useful Inventions Relating to Variable-Speed-Transmission Gear for Automobiles and other Purposes, of which the following is a specification, taken in connection with the accompanying drawings, forming part of the same.

This invention relates to variable speed transmission gear for automobiles and for other purposes and relates especially to transmission gear of this character by which the power is transmitted by belts or other flexible connectors and spur or other toothed gearing correspondingly displaced.

In the accompanying drawings showing an illustrative embodiment of this invention in which the same reference numeral refers to similar parts in the said figures, Figure 1 is an elevation. Fig. 2 is a transverse section substantially along the line 2—2 of Fig. 1. Fig. 3 is a transverse detail along the line 3—3 of Fig. 1. Fig. 4 is a transverse detail along the line 4—4 of Fig. 2.

In the illustrative embodiment of this invention shown in the drawings the drive shaft 45 may be connected to the engine or other motor in any desired way and may carry the series of drive pulleys 1, 42, 43 and 44 splined or otherwise rigidly secured thereto. A shaft 62 may be similarly mounted in suitable bearings in the frame pieces 40, 41 and may carry the driven pulleys 67, 2 and 68 rigidly secured thereto in any desired way as by keys of ordinary construction. The reverse shaft 39, which is usually desired, may be similarly mounted in the frame members and carry the driven pulley 6 as well as the reverse gear 7 which meshes with the gear 73 on the countershaft, as indicated in Fig. 1. The pulleys referred to are mounted in coöperating pairs and preferably adapted for proper frictional engagement with a suitable frictional drive member which may be flexible, if desired, and may be in the form of a flat belt loosely extending over the coöperating pulleys, the reverse belt 18′ passing over the pulleys 42 and 6 and the other belts 71, 17 and 72 similarly loosely engage the respective pairs of coöperating pulleys so that slip is allowed between the belts and the flanged pulleys unless the tightening means is in operation. It is of course understood that where desired, the driven shaft 91 connected with the axle of the vehicle may be located substantially in line with the drive shaft 45, and under these conditions suitable transmission means, such as the gears 4, upon the shaft 91 and 5 upon the counter-shaft may be used to connect the drive shaft and the counter-shaft, or any other suitable connection may be used.

The bracket 18 may be rigidly mounted on the frame members and formed with suitable depending lugs 74, 75. After placing the crank 19 in position between these lugs the key shaft 59 is passed through these lugs, its reduced non-circular or square portion 13 passing through the correspondingly shaped hole in the crank 19 so as to slidingly engage this crank as well as hold it in position between the two lugs 74, 75 by which it is thus laterally guided, the lug 21 on the crank engaging the bracket so as to normally maintain these two members in proper position as shown in Fig. 3. If desired, a suitable bearing sleeve 22 may be employed provided with a non-circular bearing to accommodate the corresponding portion 13 of the key shaft and having an annular groove extending around its periphery which is engaged by the threaded pin 23 so that this sleeve is held in position in the lug 75 and allowed to rotate freely with respect thereto. The crank may be oscillated by the operating lever 27 preferably having a return spring 78 and a suitable ratchet 30 and release 28, 29 coöperating with the ratchet sector 31. This operating lever is connected by the rod 26 with the bell crank 24 turning on the pivot 25 and connected with the crank 19 through the pivoted link 20, as indicated in Fig. 1.

Besides being oscillated to the desired extent by the operating lever as described, the key shaft may also be longitudinally moved to the desired extent by the speed lever 33 connected with the shaft by the short connector 32 and swiveling collar 35. The speed lever has the catch 36 normally held in one of the slots in the speed sector 34 by the spring 35, but which may be manually released from such slot by pressing the two parts together, as is customary. The key shaft may also be provided with suitable keys 38 and 55 adapted to coöperate with corresponding slots 79 in the tightener lever 15 (see Fig. 4). These levers, of which a number are employed, as indicated, may be revolubly mounted from the bracket by forming the tightener sleeves 57 on these levers and arranging them in suitable bearings in lugs in the bracket, the sleeves being as shown in Fig. 4 provided with annular grooves 56 with which the screw pins 54 cooperate. As seen in Fig. 2, the spring 16 normally holds this lever against the adjacent edge of the bracket so that the slot 79 in each lever is normally held in proper position to be engaged by the keys 38, 55. When one of these keys engages the corresponding slot a rotation of the key shaft will thereupon rotate the tightener lever, such as 15, and through the connector 14 pivoted to this lever and the tightener arm 11 this arm will be swung over about the tightener rod 12 carrying over the tightener in the form of the grooved pulley 3 or otherwise into active engagement with the corresponding belt, bringing the belt into close frictional contact with its drive and driven pulleys so that the driven pulley is thereupon operated, the tightener belt assuming under such conditions the dotted position indication in Fig. 2. Under these conditions the vehicle axle is gradually brought up to speed, any sudden ocks being obviated by the slipping of the ..nsmission belt. Change of the speed of the vehicle can be conveniently effected by shifting the speed lever from the idle point 60 in which it is shown, so that it engages with the desired speed notch. When in the reverse notch 63 the key 55 will engage the tightener lever 48 so as to operate the reverse tightener 51, the other belts being in their loose inactive position at this time. The low speed in the illustrated embodiment of the invention is brought into action when the speed lever is thrown over to engage the notch 66, the key 38 engaging the tightener lever 50 under these circumstances and driving the vehicle at its low speed through the drive pulley 44, the belt 72 and driven pulley 68 on the countershaft. The middle speed is brought into action when the speed lever engages the notch 64, the key 38 under these conditions engaging the speed lever 15 and operating the same. The high speed is similarly brought into action when the lever is in the notch 65, the key 55 thereupon engaging and operating the tightener lever 49, although it is, of course, obvious that other arrangements of the various driving and driven pulleys could be made so that other relative speeds would be available and might be brought into action by other movements of the speed lever. If desired also suitable rope drives could be used instead of the flat belt drives illustrated. Under such conditions the driving and driven pulleys could be made with properly shaped grooves as illustrated in the case of the pulley 46 on the shaft 45 and round or other sectioned driving belts of steel or other metal or material could be used.

Having described this invention in connection with an illustrative embodiment thereof, to the details of which disclosure the invention is not, of course, to be limited, what is claimed as new and what is desired to be secured by Letters Patent is set forth in the appended claims.

1. In variable speed transmission gear for automobiles and the like, a drive shaft, a countershaft and a reverse shaft mounted in bearings pairs of co-operating pulleys mounted on said shafts, reverse gears connecting said reverse shaft and said countershaft, belts normally loosely engaging each of said pairs of drive pulleys, a bracket provided with bearing lugs, a key shaft revolubly and slidably mounted on said bracket and provided with a non-circular portion, a bearing sleeve engaging said non-circular portion and revolubly supported in a bearing in the said bracket, a crank engaging the non-circular portion of said key shaft and supported between lugs on said bracket, spring-pressed operating mechanism to oscillate said crank and key shaft, tightener levers provided with slots rotatably mounted on said bracket and inclosing said key shaft, springs to normally hold said tightener levers in inoperative position, pivoted tightener arms, tightener pulleys mounted on said arms and connectors between said arms and tightener levers, a speed lever connected to said key shaft to cause the keys on said key shaft to selectively engage the tightener levers and oscillate the corresponding tightener into engagement with its belt when said key shaft is oscillated and a speed sector.

2. In variable speed transmission gear for automobiles and the like, a drive shaft, a countershaft and a reverse shaft mounted in suitable bearings pairs of co-operating pulleys mounted on said shafts, reverse gears connecting said reverse shaft and said countershaft, drive belts normally loosely engaging each of said pairs of drive pulleys, a bracket provided with bearing lugs, a key shaft revolubly and slidably mounted on said bracket, slotted tightener levers mounted on said bracket and having sleeves inclosing said key shaft, springs to hold said levers in position, tightener pulleys coöperating with each of said belts and connected with said tightener levers, keys on said key shaft spaced to selectively coöperate with the slots in said tightener sleeves, a speed lever connected with said key shaft and coöperating with a speed sector to move and hold said key shaft and keys in engagement with said tightener levers and an operating lever connected to said key shaft to oscillate the same and force the connected tightener lever and tightener into coöperation with the corresponding belt.

3. In variable speed transmission gear, a drive shaft, a countershaft and a reverse shaft mounted in suitable bearings pairs of co-operating drive pulleys mounted on said shafts, reverse gears connecting said reverse shaft and countershaft, drive belts normally loosely engaging each of said pairs of drive pulleys, a bracket provided with bearing lugs, a key shaft revolubly and slidably mounted on said bracket, slotted tightener levers mounted on said bracket and coöperating with said shaft, pivoted tighteners to coöperate with each of said belts and connected with said tightener levers, means to hold said tighteners and levers in inoperative position, keys on said key shaft to coöperate with the slots in said tightener levers, a speed lever to longitudinally move said key shaft and keys with respect to said tightener levers and an operating lever, connected to said key shaft to oscillate the same and force the engaged tightener lever and tightener into coöperation with the corresponding belt.

4. In variable speed transmission gear, a drive shaft and a countershaft mounted in suitable bearings pairs of co-operating drive pulleys mounted on said shaft, drive belts normally loosely engaging each of said pairs of drive pulleys, a bracket, slotted tightener levers mounted on said key shaft, tighteners to coöperate with said belts and connected with said tightener levers, means to normally hold said tighteners and tightener levers in inoperative position, keys on said key shaft spaced to selectively coöperate with said tightener levers, a speed lever to longitudinally move said key shaft and keys with respect to said tightener levers and means to oscillate said key shaft to force the engaged levers and tightener into coöperation with the corresponding belt.

5. In variable speed transmission gear, a drive shaft and a countershaft pairs of co-operating drive pulleys mounted upon said shafts, frictional drive members normally loosely engaging each of said pairs of drive pulleys, a key shaft revolubly and slidably mounted, slotted tightener levers mounted on said key shaft, tighteners to coöperate with said drive members and connected with said tightener levers, means to normally hold said tighteners and levers in inoperative position, keys on said key shaft to coöperate with the slots in said tightener levers, a speed lever to longitudinally move said key shaft and keys with respect to said tightener levers and operating means to oscillate said key shaft and tightener and force the engaged tightener into coöperation with the corresponding drive member.

6. In variable speed transmission gear, a drive shaft and a countershaft pairs of co-operating drive pulleys mounted upon said shafts, frictional drive members normally loosely engaging each of said pairs of drive pulleys, an operating shaft revolubly and slidably mounted, tightener levers coöperating with said operating shaft, tighteners connected with said levers to coöperate with said drive members, means to normally hold said tighteners and levers in inoperative position, means on said operating shaft to selectively coöperate with said tightener levers to actuate the same, means to move said operating shaft and means to oscillate said operating shaft to force the engaged tightener into coöperation with the corresponding drive member.

7. In variable speed transmission gear, a drive shaft and a countershaft pairs of coöperating drive pulleys mounted on said shafts, frictional drive members normally loosely engaging each of said pairs of drive pulleys, an operating shaft revolubly and slidably mounted, tightener levers coöperating with said operating shaft, tighteners connected with said levers and coöperating with each of said drive members, means on said operating shaft to selectively engage the tightener levers, means to longitudinally move and hold in adjusted position said operating shaft and means to oscillate said operating shaft to force the engaged tightener lever and tightener into coöperation with the corresponding drive member.

PATRICK F. FOLEY.

Witnesses:
HARRY L. DUNCAN.
JESSIE B. KAY.